United States Patent
Ma et al.

(10) Patent No.: US 11,704,566 B2
(45) Date of Patent: Jul. 18, 2023

(54) DATA SAMPLING FOR MODEL EXPLORATION UTILIZING A PLURALITY OF MACHINE LEARNING MODELS

(71) Applicant: Microsoft Technology Licensing, LLC, Redmond, WA (US)

(72) Inventors: Yiming Ma, Menlo Park, CA (US); Menglin L. Brown, Redwood City, CA (US); Bee-Chung Chen, San Jose, CA (US); Sheng Wu, Belmont, CA (US); Jun Jia, Sunnyvale, CA (US); Bo Long, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 960 days.

(21) Appl. No.: 16/446,924

(22) Filed: Jun. 20, 2019

(65) Prior Publication Data
US 2020/0401948 A1    Dec. 24, 2020

(51) Int. Cl.
*G06N 3/00* (2023.01)
*G06N 3/082* (2023.01)
*G06N 20/20* (2019.01)
*G06F 11/34* (2006.01)
*G06F 18/214* (2023.01)

(52) U.S. Cl.
CPC ......... *G06N 3/082* (2013.01); *G06F 11/3495* (2013.01); *G06F 18/214* (2023.01); *G06N 20/20* (2019.01)

(58) Field of Classification Search
CPC ... G06N 20/20; G06F 11/3495; G06K 9/6256
See application file for complete search history.

(56) References Cited

U.S. PATENT DOCUMENTS

2017/0323268 A1    11/2017 Zhang et al.
2018/0240041 A1*   8/2018 Koch ................ G06F 16/24578
(Continued)

FOREIGN PATENT DOCUMENTS

EP    3561735 A1    10/2019

OTHER PUBLICATIONS

"International Search Report and Written Opinion issued in PCT Application No. PCT/US2020/032284", dated Aug. 19, 2020, 14 Pages.

*Primary Examiner* — Pakee Fang
(74) *Attorney, Agent, or Firm* — Schwegman, Lundberg & Woessner, P.A.

(57) ABSTRACT

The disclosed embodiments provide a system for processing data. During operation, the system obtains a training dataset containing a first set of records associated with a first set of identifier (ID) values and an evaluation dataset containing a second set of records associated with a second set of ID values. Next, the system selects a random subset of ID values from the second set of ID values. The system then generates a sampled evaluation dataset comprising a first subset of records associated with the random subset of ID values in the second set of records. The system also generates a sampled training dataset comprising a second subset of records associated with the random subset of ID values in the first set of records. Finally, the system outputs the sampled training dataset and the sampled evaluation dataset for use in training and evaluating a machine learning model.

13 Claims, 7 Drawing Sheets

(56) References Cited

U.S. PATENT DOCUMENTS

2019/0122141 A1    4/2019  Zhen et al.
2019/0188602 A1*  6/2019  Kwant ..................... G06N 3/08
2019/0259041 A1*  8/2019  Jackson ................. G06N 5/048
2020/0143240 A1*  5/2020  Baker ...................... G06N 3/04

* cited by examiner

DATA SAMPLING FOR MODEL EXPLORATION UTILIZING A PLURALITY OF MACHINE LEARNING MODELS

BACKGROUND

Field

The disclosed embodiments relate to machine learning. More specifically, the disclosed embodiments relate to data sampling for model exploration in machine learning.

Related Art

Analytics is commonly used to discover trends, patterns, relationships, and/or other attributes related to large sets of complex, interconnected, and/or multidimensional data. In turn, the discovered information is used to derive insights and/or guide decisions or actions related to the data. For example, business analytics may be used to assess past performance, guide business planning, and/or identify actions that may improve future performance.

To glean such insights, large datasets of features are analyzed using regression models, artificial neural networks, support vector machines, decision trees, naïve Bayes classifiers, and/or other types of machine learning models. The discovered information can then be used to guide decisions and/or perform actions related to the data. For example, the output of a machine learning model is used to guide marketing decisions, assess risk, detect fraud, predict behavior, and/or customize or optimize use of an application or website.

However, significant time, effort, and overhead is spent on feature selection during creation and training of machine-learning models for analytics. For example, a dataset for a machine-learning model may have thousands to millions of features, including features that are created from combinations of other features, while only a fraction of the features and/or combinations may be relevant and/or important to the machine-learning model. At the same time, training and/or execution of machine-learning models with large numbers of features and/or large datasets typically require more memory, computational resources, and time than those of machine-learning models with smaller numbers of features and/or smaller datasets. Excessively complex machine-learning models that utilize too many features may additionally be at risk for overfitting.

Consequently, machine learning and/or analytics may be facilitated by mechanisms for improving the creation, profiling, management, sharing, and reuse of features and/or machine learning models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus and system for training and evaluating machine learning models. The machine learning models include, but are not limited to, regression models, artificial neural networks, support vector machines, decision trees, random forests, gradient boosted trees, naïve Bayes classifiers, Bayesian networks, deep learning models, hierarchical models, and/or ensemble models. Each machine learning model includes a global version and multiple personalized versions. For example, a machine learning model is used to generate recommendations of jobs (or other content) to users. A global version of the machine learning model is created for all users and jobs, a user-specific version of the machine learning model is created for each user, and a job-specific version of the machine learning model is created for each job. The output of the global version, a user-specific version for a given user, and a job-specific version for a given job are combined to generate a score representing the user's probability of applying to the job, clicking on the job, and/or otherwise responding positively to a recommendation of the job.

More specifically, the disclosed embodiments provide a method, apparatus, and system for sampling data used to train and evaluate machine learning models that include personalized versions for different entities. Each machine learning model is associated with a full training dataset that is used to train the machine learning model, as well as a full evaluation data set that is used to evaluate the machine learning model's performance after training is complete. As the numbers of records and/or features in the training dataset and/or evaluation dataset increase, additional amounts of processor and memory resources are required to perform training and subsequent evaluation of the machine learning model.

To expedite exploration of different hyperparameters, feature sets, and/or other types of training configurations with the machine learning model, a random subset of entity IDs is sampled from the evaluation dataset, and a sampled training dataset and a sampled evaluation dataset are generated from the sampled subset of entity IDs. For example, a certain percentage or proportion of user IDs is randomly selected from the evaluation dataset, and records containing the user IDs from the evaluation dataset are included in the sampled evaluation dataset. Records containing the same user IDs from the training dataset are similarly included in the sampled training dataset. When records in the training and evaluation datasets contain job IDs as well as user IDs, a set of job IDs is identified from records containing the sampled user IDs in the evaluation dataset, and records containing the identified job IDs in the training dataset are also included in the sampled training dataset. As a result, all entity IDs that appear in the sampled evaluation dataset also appear in the sampled training dataset.

Generation of the sampled evaluation and training datasets is also repeated a number of times, and each sampled training dataset and the corresponding sampled evaluation dataset are used with a different training configuration to train and evaluate the machine learning model. For example, each sampled evaluation dataset and corresponding sampled training dataset are generated from a different random subset of entity IDs from the full evaluation dataset. The sampled training dataset is used with a feature set and/or one or more hyperparameters in a training configuration for the machine learning model to train the global and personalized versions of the machine learning model, and the sampled evaluation dataset is subsequently used to evaluate the performance of the trained global and personalized versions. The process is repeated to produce multiple sets of global and personalized versions of the machine learning model from different combinations of features and/or hyperparameters, and the highest-performing machine learning model is selected for use in a live, production, and/or real-world setting or environment. The selected machine learning model is then trained using the full training dataset and evaluated using the full evaluation dataset before the machine learning model is deployed in the environment.

By sampling entity IDs from evaluation datasets that are smaller than training datasets and using the sampled entity IDs to generate sampled training and evaluation datasets, the disclosed embodiments ensure that personalized versions of the machine learning model are created for the sampled entity IDs from the sampled training dataset and can subsequently be evaluated using records associated with the same entity IDs in the evaluation dataset. In addition, the generation of sampled training and evaluation datasets that are significantly smaller than the corresponding full training and evaluation datasets expedites training and evaluation of the machine learning model, which reduces the amount of time and/or resources required to train multiple machine learning models using multiple training configurations. The increased speed of training further allows for a more thorough exploration of hyperparameters, feature sets, and/or training configurations for the machine learning model, which in turn results in a higher-performing machine learning model.

In contrast, conventional techniques perform training and/or evaluation of machine learning models using full training and/or evaluation datasets. As a result, training and evaluation of a single machine learning model requires significantly more time and/or computational resources than training and evaluation using the sampled training and evaluation datasets. The increased overhead and/or delay associated with training using a full training dataset additionally interferes with exploration and/or optimization of hyperparameters, feature sets, and/or training configurations for the machine learning model, which can result in reduced performance of the machine learning model.

The conventional techniques also, or instead, sample individual records from training and/or evaluation datasets to reduce the size of the datasets. However, such record-based sampling removes data associated with individual entities from each dataset, which causes each personalized version of the machine learning model to be trained and/or evaluated using incomplete data for the corresponding entity. As a result, the personalized version is not trained to fit to all available behavior, preferences, and/or other signals for the entity in the training dataset and is not fully evaluated with respect to additional signals for the entity in the evaluation dataset. In turn, such limited training and/or evaluation of the personalized version results in reduced performance of the personalized version. Consequently, the disclosed embodiments improve computer systems, applications, user experiences, tools, and/or technologies related to training machine learning models, evaluating machine learning models, feature engineering, and/or hyperparameter optimization.

Data Sampling for Model Exploration

Figure 1:
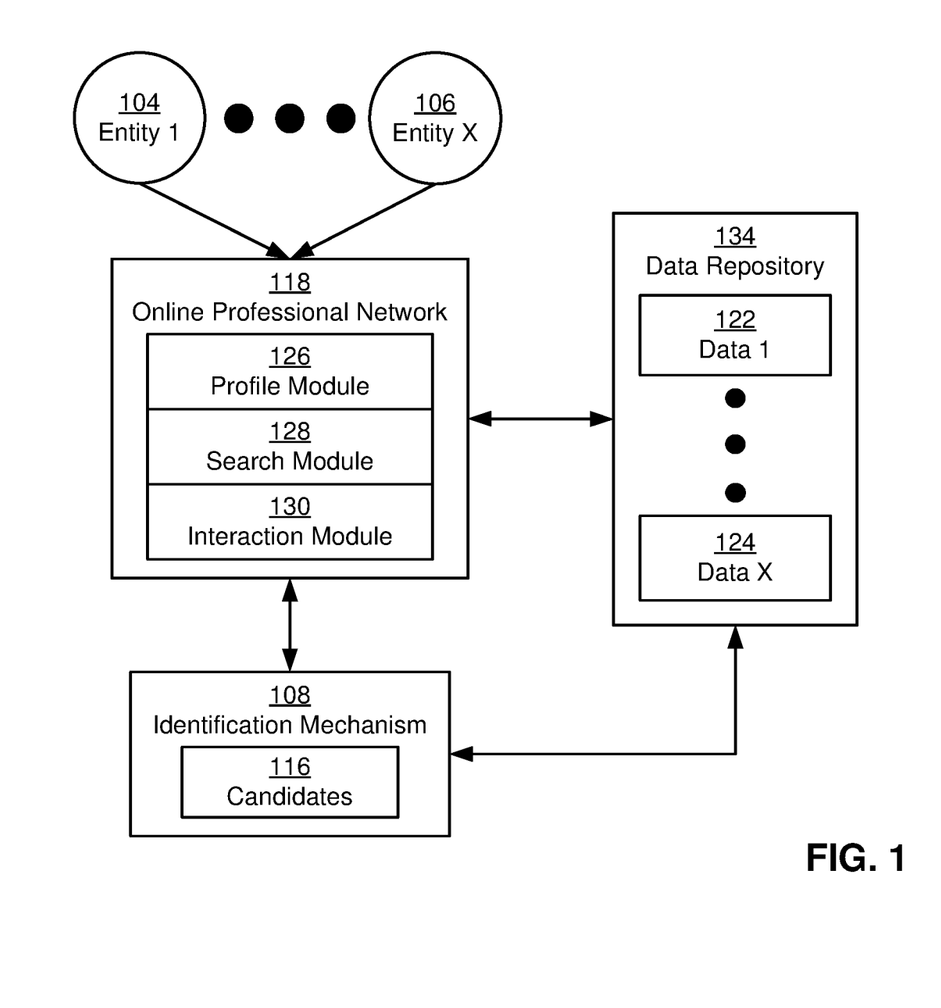
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 is inputted into the machine learning model(s), along with features and/or characteristics of the corresponding opportunities (e.g., required or desired skills, education, experience, industry, title, etc.). In turn, the machine learning model(s) output scores representing the strengths of candidates 116 with respect to the opportunities and/or qualifications related to the opportunities (e.g., skills, current position, previous positions, overall qualifications, etc.). For example, the machine learning model(s) generate scores based on similarities between the candidates' profile data with online network 118 and descriptions of the opportunities. The model(s) further adjust the scores based on social and/or other validation of the candidates' profile data (e.g., endorsements of skills, recommendations, accomplishments, awards, patents, publications, reputation scores, etc.). The rankings are then generated by ordering candidates 116 by descending score.

In turn, rankings based on the scores and/or associated insights improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may output a ranking of candidates for a given set of job qualifications as search results to a recruiter after the recruiter performs a search with the job qualifications included as parameters of the search. In a fourth example, the component(s) may recommend jobs to a candidate based on the predicted relevance or attractiveness of the jobs to the candidate and/or the candidate's likelihood of applying to the jobs.

Figure 2:
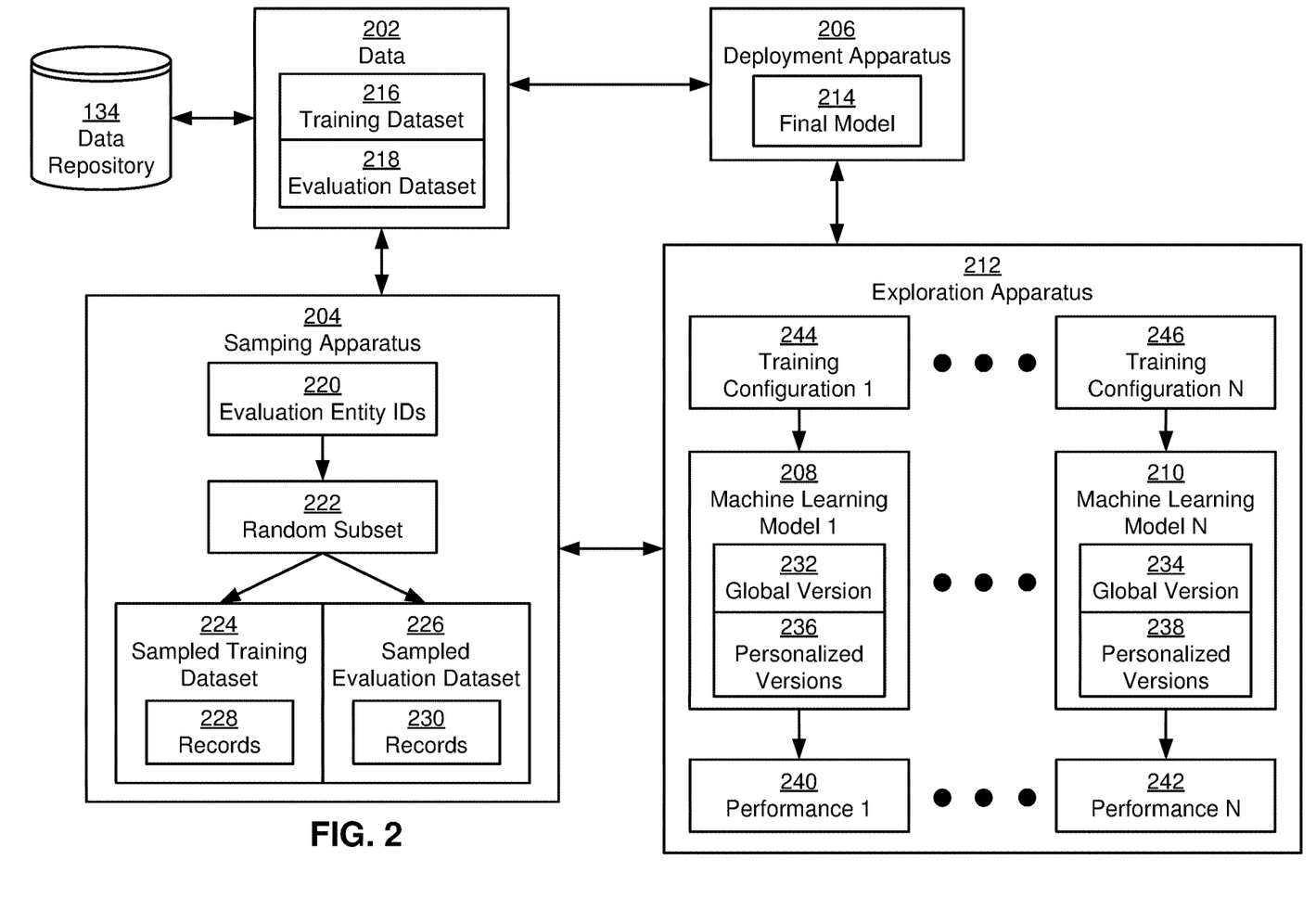
FIG. 2 shows a system for processing data in accordance with the disclosed embodiments.

In one or more embodiments, some or all machine learning models used to generate scores and/or rankings associated with jobs and candidates in online network 118 are personalized to the jobs, candidates, and/or other entities in online network 118. As shown in FIG. 2, data repository 134 and/or another primary data store are queried for data 202 that includes a training dataset 216 and an evaluation dataset 218.

Training dataset 216 includes records that are used to train a number of machine learning models (e.g., machine learning model 1 208, machine learning model n 210), and evaluation dataset 218 is used to evaluate the performance of each machine learning model after training of the machine learning model is complete. For example, training dataset 216 includes a majority (e.g., 70-80%) of data that can be used with the machine learning models, and evaluation dataset 218 includes the remainder of the data. Evaluation dataset 218 is optionally divided into a validation dataset that is used to evaluate the performance of individual machine learning models and a test dataset that is used to evaluate the performance of a final model 214 that is selected from the machine learning models.

In one or more embodiments, records in training dataset 216, evaluation dataset 218, and/or other data 202 in data repository 134 include standardized, organized, and/or classified attributes. For example, skills in data 202 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure) is represented by a numeric company ID in data repository 134.

In one or more embodiments, each machine learning model includes a global version (e.g., global versions 232-234) that is used with all entities (e.g., members, jobs, companies, content, etc.) in training dataset 216 and evaluation dataset 218. Each machine learning model also includes a set of personalized versions (e.g., personalized versions 236-238) that are customized or tailored to individual entities.

For example, a machine learning model created by exploration apparatus 212 includes a global version, a set of personalized user-specific versions, and a set of personalized job-specific versions. The global version tracks the behavior or preferences of all candidates with respect to all jobs in data repository 134. Each user-specific version of the model is customized to the individual behavior or preferences of a corresponding candidate with respect to certain job features (e.g., a candidate's personal preference for jobs that match the candidate's skills). Each job-specific version identifies the relevance or attraction of a corresponding job to certain candidate features (e.g., a job's likelihood of attracting candidates that prefer skill matches).

The output of the global version, a user-specific version for the candidate, and/or a job-specific version for a given job are combined to generate a score representing the user's predicted probability of applying to the jobs, clicking on the jobs, and/or otherwise responding positively to impressions of the jobs after the user is shown the jobs. Continuing with the above example, a generalized linear mixed model for predicting the probability of member m applying to job j using logistic regression is represented using the following equation:

$$g(E[y_{mjt}]) = x'_{mjt}b + s'_j\alpha_m + q'_m\beta_j,$$

where $$g(E[y_{mjt}]) = \log\frac{E[y_{mjt}]}{1 - E[y_{mjt}]}$$

is the link function for the model, b is the coefficient vector representing the fixed effects of the global version of the model, $\alpha_m$ is a coefficient vector representing the random effects of a user-specific version of the model for member m, and $\beta_j$ is a coefficient vector representing the random effects of a job-specific version of the model for job j. In addition, $x_{mjt}$ represents the feature vector for the global version, which contains member features of member m, job features of job j, derived features, and/or features associated with context t. Finally, $s_j$ represents the feature vector of job j (i.e., job features 212), and $q_m$ represents the feature vector of member m (i.e., member features 208).

When a member m has provided multiple responses to different jobs, the member's personalized coefficient vector $\alpha_m$ can be accurately estimated, and scores and/or recommendations can be personalized to the member. Conversely, when member m lacks previous responses to jobs, the posterior mean of $\alpha_m$ is close to 0, and the output of the machine learning model falls back to the global fixed effects component of $x'_{mjt}b$. Similarly, when a job j includes multiple responses by members, the job's personalized coefficient vector $\beta_j$ can be used to adapt the output of the machine learning model with respect to the job. On the other hand, a lack of responses to the job causes the posterior mean of $\beta_j$ to be close to 0, and the global version of the machine learning model contributes overwhelmingly to the score between the job and a given member.

A more generic formulation of the generalized linear mixed model above includes the following representation:

$$g(E[y_n]) = x'_n b + \sum_{r \in \mathcal{R}} z'_{rn}\gamma_{ri(r,n)},$$

$$b \sim p(b), \gamma_{rl} \sim p(\gamma_{rl}), \forall r \in \mathcal{R}, 1 \le l \le N_r$$

With respect to the above representation, let R denote the collection of random effect types being modeled. Also let i(r, n) denote an indexing function that retrieves the index of random effect type r in the nth training sample (e.g., if random effect type r represents the per-job random effect, i(r, n) returns the job ID associated with sample n). Given the indexing function, $\gamma_{ri}(r, n)$ represents a random effect coefficient vector for random effect type r in the nth training sample, and $z'_{rn}$ represents the corresponding feature vector for random effect type r in the nth training sample.

In one or more embodiments, an exploration apparatus 212 trains each machine learning model using a different training configuration (e.g., training configuration 1 244, training configuration n 246). Each training configuration contains a set of features to be inputted into the corresponding machine learning model.

Continuing with the above example, a training configuration includes different sets of features for the global version, user-specific versions, and job-specific versions of a machine learning model that recommends jobs to candidates (or candidates to jobs). Features used by the global version include, but are not limited to, a title, skills, education, seniority, industry, location, and/or other attributes from a candidate's profile with an online system (e.g., online network 118 of FIG. 1) and/or resume. The features also include declared or inferred attributes of a job, such as the job's title, industry, seniority, desired skill and experience, salary range, and/or location. The features additionally include a context of the candidate's impression of the job, such as a time and location (e.g., geographic location, application, website, web page, device or platform used to access the online system, etc.) at which the job is to be shown or recommended to the candidate. Finally, the features include derived features that are calculated from the member and job attributes, such as cross products, cosine similarities, statistics, and/or other combinations, aggregations, scaling, and/or transformations of the member and/or job attributes.

Features used by a user-specific version of the machine learning model include a candidate's recent and/or long-term history of interactions with jobs, the candidate's stated or inferred job preferences (e.g., preferred title, function, industry, seniority, location, company, etc.), and/or other representations of the candidate's job-seeking behavior or preferences. The features also include some or all job attributes of a job. Features used by a job-specific version of the machine learning model include attributes of a candidate that can be used to predict the candidate's interest in the job.

Each training configuration also, or instead, includes one or more hyperparameters for the corresponding machine learning model. For example, the hyperparameters include a convergence parameter that adjusts the rate of convergence of the machine-learning model. In another example, the hyperparameters include a clustering parameter that controls the amount of clustering (e.g., number of clusters) in a clustering technique and/or classification technique that utilizes clusters. In a third example, the hyperparameters specify a feature complexity for features inputted into the machine-learning model, such as the number of topics or items in n-grams used during natural language processing. In a fourth example, the hyperparameters include a model training parameter that controls training of the machine-learning model, such as a step size or momentum in a gradient descent technique. In a fifth example, the hyperparameters include a model selection parameter that specifies the type of the machine-learning model (e.g., logistic regression, artificial neural network, support vector machine, decision tree, deep-learning model, etc.). In a sixth example, the hyperparameters include a decay parameter, such as a parameter for determining an annealing schedule in simulated annealing. In a seventh example, the hyperparameters include "hyper-hyperparameters," such as starting positions, default values, and/or other parameters related to exploring a search space for other hyperparameters. In an eighth example, the hyperparameters include a threshold, such as a threshold for removing links with low weights in artificial neural networks. In a ninth example, the hyperparameters include In one or more embodiments, some or all training configurations used by exploration apparatus 212 to train machine learning models include one or more hyperparameters that control the amount of personalization of the machine learning model. For example, the generic formulation of the generalized linear mixed model above includes the following objective function:

$$\text{Max}_{b,\{\Gamma_r\}} \left\{ \left[ \sum_{i \in \Omega} \log\log p(s_i) \right] + \lambda_b p(b) + \sum_{r \in R} \lambda_r \sum_{l=1}^{N_r} p(\gamma_{rl}) \right\}$$

The objective function above includes model parameters of $\{b, \{\Gamma_r\}\}$, where b represents fixed effect coefficients of the global version and $\Gamma_r = \{\gamma_{rl}\}$ represents random effect coefficients for random effect type r, with l ranging from 1 to the total number of instances for random effect type r (e.g., the total number of members in a dataset when r represents members). Within the objective function, $p(s_i)$ represents the likelihood function of a given response associated with sample i in the set of training data $\Omega$, given b and $\Gamma$.

The objective function above also includes hyperparameters of $\lambda_b$ and $\{\lambda_r\}$. $\lambda_b$ represents the contribution of the fixed effect coefficients to the objective function, and each $\lambda_r$ represents the contribution of random effect coefficients for random effect type r to the objective function.

After exploration apparatus 212 trains global and personalized versions of a given machine learning model using training dataset 216 and the corresponding training configuration, exploration apparatus 212 evaluates the performance (e.g., performance 1 240, performance n 242) of the machine learning model using evaluation dataset 218. For example, exploration apparatus 212 applies the global version of the machine learning model to each record in evaluation dataset 218 and personalized versions of the machine learning model to records with the corresponding entity IDs in evaluation dataset 218. For each record in evaluation dataset 218, exploration apparatus 212 aggregates the output of the global version and personalized versions of the machine learning model into a score and compares the score to a corresponding label for the record. Exploration apparatus 212 then evaluates the performance of the machine learning model by calculating a precision, recall, receiver operating characteristic (ROC) area under the curve (AUC), F1 score, observed/expected (O/E) ratio, mean absolute error, mean squared error, and/or another performance metric based on the comparison.

In one or more embodiments, exploration apparatus 212 trains and evaluates multiple machine learning models using different training configurations to explore different feature sets and/or hyperparameters for the machine learning models. In turn, exploration apparatus 212 identifies feature sets and/or hyperparameters that result in the best-performing machine learning model.

For example, exploration apparatus 212 trains first a set of machine learning models using different sets of features from training dataset 216. Exploration apparatus 212 evaluates the performance of the machine learning models using evaluation dataset 218, identifies the machine learning model with the best performance, and obtains the set of features inputted into the machine learning model from the corresponding training configuration. Exploration apparatus 212 trains a second set of machine learning models using the same set of features and different values of a first hyperparameter and selects a machine learning model with the highest performance from the second set of machine learning models. Exploration apparatus 212 trains a third set of machine learning models using the set of features, the value of the first hyperparameter from the highest performing model in the second set of machine learning models, and different values of a second hyperparameter. Exploration apparatus 212 then obtains a value of the second hyperparameter associated with the highest-performing machine learning model in the third set of machine learning models. Exploration apparatus 212 optionally repeats the process of varying a single attribute (e.g., feature set, hyperparameter, etc.) used to train the machine learning models, identifying the value of the attribute that results in the best performance, fixing the value, and exploring subsequent attributes used to train the machine learning models until optimal values have been identified for all relevant attributes.

In one or more embodiments, the system of FIG. 2 includes functionality to reduce the size of training data used to train the machine learning models and evaluation data used to evaluate the performance of the trained machine learning models. The smaller data sizes reduce the amount of time, resources, and/or overhead required to train and evaluate the machine learning models, which increases the efficiency and/or thoroughness with which hyperparameters, feature sets, and/or other types of training configurations are selected for the machine learning models.

More specifically, a sampling apparatus 204 generates a sampled training dataset 224 that includes records 228 that are sampled from training dataset 216 and a sampled evaluation dataset 226 that includes records 230 that are sampled from evaluation dataset 218. For example, records 228 in sampled training dataset 224 represent a proportion or percentage of records in training dataset 216. Similarly, records 230 in sampled evaluation dataset 226 represent a proportion or percentage of records in evaluation dataset 218.

In one or more embodiments, sampling apparatus 204 samples records 228-230 from training dataset 216 and evaluation dataset 218 based on entity IDs associated with records 228-230. In these embodiments, sampling apparatus 204 selects a random subset 222 of evaluation entity IDs 220 from evaluation dataset 218 and populates sampled evaluation dataset 226 with records 230 associated with the selected entity IDs from evaluation dataset 218. Sampling apparatus 204 then identifies records 228 associated with the same entity IDs in training dataset 216 and populates sampled training dataset 224 using the identified records 228.

Because the number of entity IDs in evaluation dataset 218 is significantly smaller than the number of entity IDs in training dataset 216, generation of sampled training dataset 224 and sampled evaluation dataset 226 from a given random subset 222 of evaluation entity IDs 220 in evaluation dataset 218 ensures that an entity ID found in sampled training dataset 224 is also found in sampled evaluation dataset 226. In turn, personalized versions (e.g., personalized versions 236-238) of a machine learning model can be generated from records 228 associated with the sampled entity IDs in sampled training dataset 224, and the same personalized versions can be evaluated using records 230 associated with the sampled entity IDs in sampled evaluation dataset 226.

Figure 3A:
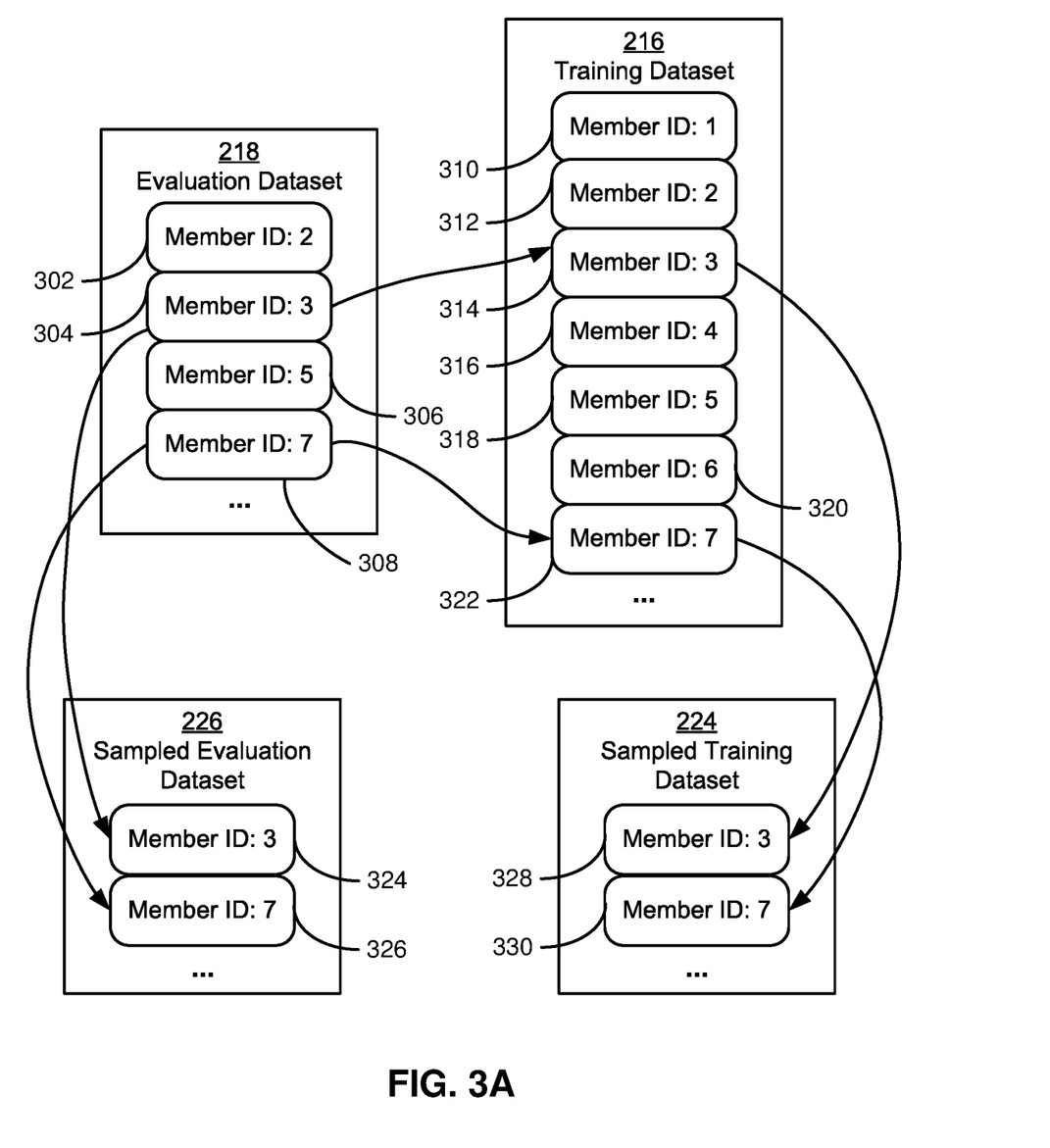
FIG. 3A shows the example generation of a sampled training dataset and a sampled evaluation dataset in accordance with the disclosed embodiments.

The operation of sampling apparatus 204 is illustrated using the example sampled training dataset 224, sampled evaluation dataset 226, training dataset 216, and evaluation dataset 218 in FIG. 3A. As shown in FIG. 3A, evaluation dataset 218 includes records 302-308 grouped under member IDs of 2, 3 5, and 7, respectively. Training dataset 216 includes larger numbers of records 310-322 grouped under member IDs of 1, 2, 3, 4, 5, 6, and 7, respectively.

To generate sampled evaluation dataset 226, sampling apparatus 204 randomly selects member IDs of 3 and 7 from evaluation dataset 218. Sampling apparatus 204 copies records 304 grouped under the member ID of 3 in evaluation dataset 218 to a corresponding set of records 324 in sampled evaluation dataset 226 and copies records 308 grouped under the member ID of 7 in evaluation dataset 218 to a corresponding set of records 326 in sampled evaluation dataset 226.

To generate sampled training dataset 224, sampling apparatus 204 matches the sampled member ID of 3 to a set of records 314 in training dataset 216 and the sampled member ID of 7 to another set of records 322 in training dataset 216. Sampling apparatus 204 then copies records 314 grouped under the member ID of 3 in training dataset 216 to a corresponding set of records 328 in sampled training dataset 224 and copies records 322 grouped under the member ID of 7 in training dataset 216 to a corresponding set of records 330 in sampled training dataset 224. As a result, both sampled evaluation dataset 226 and sampled training dataset 224 contain records (e.g., records 324-326 and 328-330) associated with the sampled member IDs of 3 and 7.

In one or more embodiments, sampling apparatus 204 includes functionality to generate sampled training dataset 224 and sampled evaluation dataset 226 for machine learning models that include multiple random effect types. For example, each machine learning model includes one set of personalized versions that are adapted to a set of members and another set of personalized versions that are adapted to a set of jobs. As a result, records in training dataset 216 and evaluation dataset 218 are associated with two sets of entity IDs: a first set of member IDs for the members, and a second set of entity IDs for the jobs.

To account for multiple random effects types in training dataset 216 and evaluation dataset 218, sampling apparatus 204 selects combinations of evaluation entity IDs 220 found in records of evaluation dataset 218 for inclusion in random subset 222. Sampling apparatus 204 populates sampled evaluation dataset 226 with records 230 associated with the selected combinations of entity IDs from evaluation dataset 218. Sampling apparatus 204 then identifies records 228 in training dataset 216 that contain one or more of the selected entity IDs and populates sampled training dataset 224 using the identified records 228. As a result, sampled training dataset 224 includes all records 230 in training dataset 216 that are associated with all entity IDs in random subset 222.

Figure 3B:
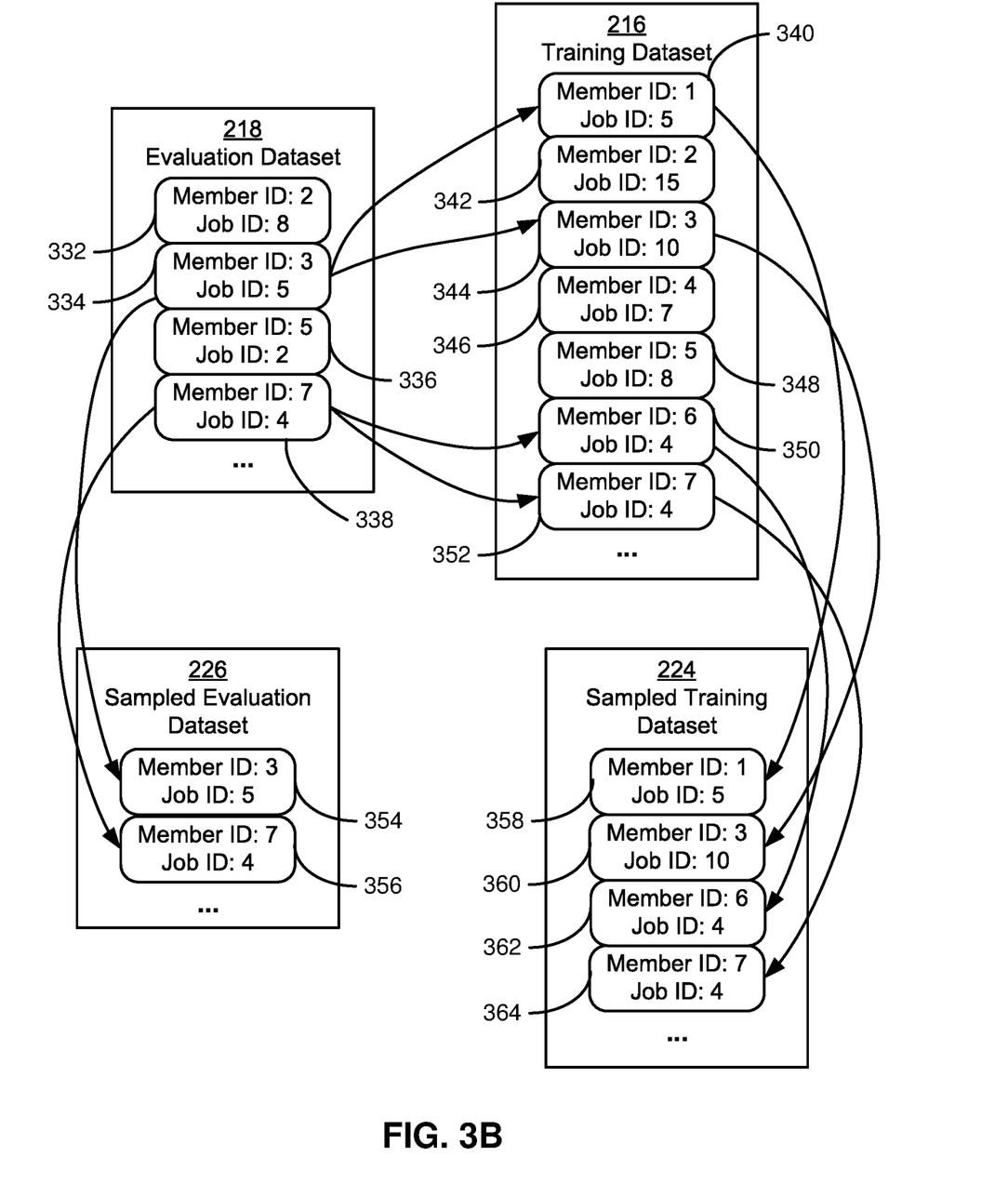
FIG. 3B shows the example generation of a sampled training dataset and a sampled evaluation dataset in accordance with the disclosed embodiments.

The operation of sampling apparatus 204 in generating sampled training dataset 224 and sampled evaluation dataset 226 in the presence of multiple random effects is illustrated using the example sampled training dataset 224, sampled evaluation dataset 226, training dataset 216, and evaluation dataset 218 in FIG. 3B. As shown in FIG. 3B, evaluation dataset 218 includes records 332-338 grouped under pairs of member IDs and job IDs. Records 332 are grouped under a member ID of 2 and a job ID of 8, records 334 are grouped under a member ID of 3 and a job ID of 5, records 336 are grouped under a member ID of 5 and a job ID of 2, and records 338 are grouped under a member ID of 7 and a job ID of 4.

Similarly, training dataset 216 includes larger numbers of records 340-352 grouped under the same and/or different pairs of member IDs and job IDs. Records 340 are grouped under a member ID of 1 and a job ID of 5, records 342 are grouped under a member ID of 2 and a job ID of 15, records 344 are grouped under a member ID of 3 and a job ID of 10, records 346 are grouped under a member ID of 4 and a job ID of 7, records 348 are grouped under a member ID of 5 and a job ID of 8, records 350 are grouped under a member ID of 6 and a job ID of 4, and records 352 are grouped under a member ID of 7 and a job ID of 4.

Within evaluation dataset 218 and training dataset 216, records associated with a given member ID and job ID pair include information related to interaction and/or compatibility between a corresponding member and job. For example, a record that contains a member ID and a job ID includes relevance scores between the corresponding member and job, the context of a recommendation of the job to the member (e.g., the time and location of the recommendation), and/or the member's response to the recommendation.

To generate sampled evaluation dataset 226, sampling apparatus 204 randomly selects member IDs of 3 and 7 and/or job IDs of 5 and 4 from evaluation dataset 218. Sampling apparatus 204 copies records 334 grouped under the member ID of 3 and job ID of 5 in evaluation dataset 218 to a corresponding set of records 354 in sampled evaluation dataset 226. Sampling apparatus 204 also copies records 338 grouped under the member ID of 7 and job ID of 4 in evaluation dataset 218 to a corresponding set of records 356 in sampled evaluation dataset 226.

To generate sampled training dataset 224, sampling apparatus 204 matches the member ID of 3 in records 334 to a set of records 344 in training dataset 216 and the member ID of 7 to another set of records 352 in training dataset 216. Sampling apparatus 204 also matches the job ID of 5 in records 334 to a set of records 340 in training dataset 216 and the job ID of 4 to two sets of records 350 and 352 in training dataset 216. Sampling apparatus 204 then copies records 340 to a corresponding set of records 358 in sampled training dataset 224 and copies records 344 to a corresponding set of records 360 in sampled training dataset 244. Sampling apparatus 204 also copies records 350 to a corresponding set of records 362 in sampled training dataset 224 and copies records 352 to a corresponding set of records 364 in sampled training dataset 224. As a result, both sampled evaluation dataset 226 and sampled training dataset 224 contain records (e.g., records 324-326 and 328-330) associated with the sampled member IDs of 3 and 7 and/or sampled job IDs of 4 and 5.

After sampling apparatus 204 generates sampled training dataset 224 from training dataset 216 and sampled evaluation dataset 226 from sampled evaluation dataset 226, exploration apparatus 212 uses sampled training dataset 224 and a corresponding training configuration to train a machine learning model. After training is complete, exploration apparatus 212 uses sampled evaluation dataset 226 to evaluate the performance of the machine learning model.

To explore different training configurations for the machine learning model, sampling apparatus 204 generates multiple sampled training datasets and sampled evaluation datasets, with each sampled evaluation dataset 226 and a corresponding sampled training dataset 224 containing records (e.g., records 228-230) associated with a different random subset 222 of evaluation entity IDs 220 from evaluation dataset 218. Exploration apparatus 212 uses the sampled training datasets, sampled evaluation datasets, and multiple training configurations to train and evaluate multiple machine learning models.

Because each sampled training dataset 224 and sampled evaluation dataset 226 includes a fraction of the data in the corresponding training dataset 216 and evaluation dataset 218, exploration apparatus 212 is able to train and evaluate each machine learning model in a corresponding fraction of the time and/or using a corresponding fraction of the resources required to train and execute the machine learning model using the full training dataset 216 and evaluation dataset 218. For example, exploration apparatus 212 requires multiple hours of sequential execution on a set of allocated memory and processor resources to train and evaluate a machine learning model using billions of records in training dataset 216 and evaluation dataset 218. Conversely, exploration apparatus 212 is able to train and evaluate multiple machine learning models in parallel on the same set of resources using a significantly smaller number of records (e.g., records 228-230) in sampled training dataset 224 and sample evaluation dataset 226.

In turn, exploration apparatus 212 uses expedited training and evaluation of the machine learning models to explore various feature sets and/or hyperparameters in training configurations for the machine learning models. As mentioned above, exploration apparatus 212 includes functionality to train multiple sets of machine learning models. Each set of machine learning models is used to explore values of one or more attributes in the training configurations, while the remaining attributes are fixed. After the set of machine learning models is trained, the performances of the machine learning models in the set are compared, and one or more values of the explored attribute(s) used to produce the highest-performing machine learning model in the set are used in subsequent training configurations.

After all attributes in the training configurations have been explored, exploration apparatus 212 generates the best-performing combination of attribute values from the training configurations and provides the set of attribute values to a deployment apparatus 206. Deployment apparatus 206 uses the identified attribute values and training dataset 216 to train global and personalized versions of final model 214. Deployment apparatus 206 then evaluates the performance of final model 214 using evaluation dataset 218 and/or a test dataset in evaluation dataset 218. After the performance of final model 214 is validated, deployment apparatus 206 deploys final model 214 in a live, production, and/or real-world environment or setting. In the deployed environment or setting, the deployed final model 214 is used to supplement or perform tasks such as managing the execution of an application, personalizing user experiences, managing relationships, making clinical decisions, carrying out transactions, operating autonomous vehicles or machines, and/or analyzing metrics or measurements.

In one or more embodiments, deployment apparatus 206 trains final model 214 using a scaled version of a regularization hyperparameter associated with the global version of each machine learning model. In some embodiments, the regularization hyperparameter is represented by $\lambda_b$ in the objective function for the generalized linear mixed model described above. During exploration of the regularization hyperparameter, the global version is trained using sampled training dataset 224, which contains records 228 that are a fraction of the total number of records in training dataset 216. As a result, the value of the regularization hyperparameter selected by exploration apparatus 212 for use with final model 214 reflects the smaller number of records in sampled training dataset 224.

To ensure that the regularization hyperparameter results in similar performance in final model 214, exploration apparatus 212, deployment apparatus 206, and/or another component scale the regularization hyperparameter by the inverse of the proportion of training dataset 216 represented by sampled training dataset 224. For example, if training dataset 216 has N records and sampled training dataset 224 has M records, with N>>M, the component calculates a new value of the regularization parameter as $N/M*\lambda_b$. Deployment apparatus 206 then uses the new value to train final model 214.

By sampling entity IDs from evaluation datasets that are smaller than training datasets and using the sampled entity IDs to generate sampled training and evaluation datasets, the disclosed embodiments ensure that personalized versions of the machine learning model are created for the sampled entity IDs from the sampled training dataset and can subsequently be evaluated using records associated with the same entity IDs in the evaluation dataset. In addition, the generation of sampled training and evaluation datasets that are significantly smaller than the corresponding full training and evaluation datasets expedites training and evaluation of the machine learning model, which reduces the amount of time and/or resources required to train multiple machine learning models using multiple training configurations. The increased speed of training further allows for a more thorough exploration of hyperparameters, feature sets, and/or training configurations for the machine learning model, which in turn results in a higher-performing machine learning model.

In contrast, conventional techniques perform training and/or evaluation of machine learning models using full training and/or evaluation datasets. As a result, training and evaluation of a single machine learning model requires significantly more time and/or computational resources than training and evaluation using the sampled training and evaluation datasets. The increased overhead and/or delay associated with training using a full training dataset additionally interferes with exploration and/or optimization of hyperparameters, feature sets, and/or training configurations for the machine learning model, which can result in reduced performance of the machine learning model.

The conventional techniques also, or instead, sample individual records from training and/or evaluation datasets to reduce the size of the datasets. However, such record-based sampling removes data associated with individual entities from each dataset, which causes each personalized version of the machine learning model to be trained and/or evaluated using incomplete data for the corresponding entity. As a result, the personalized version is not trained to fit to all available behavior, preferences, and/or other signals for the entity in the training dataset and is not fully evaluated with respect to additional signals for the entity in the evaluation dataset. In turn, such limited training and/or evaluation of the personalized version results in reduced performance of the personalized version. Consequently, the disclosed embodiments improve computer systems, applications, user experiences, tools, and/or technologies related to training machine learning models, evaluating machine learning models, feature engineering, and/or hyperparameter optimization.

Those skilled in the art will appreciate that the system of FIG. 2 may be implemented in a variety of ways. First, sampling apparatus 204, exploration apparatus 212, deployment apparatus 206, and/or data repository 134 may be provided by a single physical machine, multiple computer systems, one or more virtual machines, a grid, one or more databases, one or more filesystems, and/or a cloud computing system. Sampling apparatus 204, exploration apparatus 212, and deployment apparatus 206 may additionally be implemented together and/or separately by one or more hardware and/or software components and/or layers.

Second, the system may be used with various types of machine learning models and/or tasks. For example, machine learning models trained by exploration apparatus 212 include, but are not limited to, regression models, artificial neural networks, support vector machines, decision trees, random forests, gradient boosted trees, naïve Bayes classifiers, Bayesian networks, clustering techniques, collaborative filtering techniques, deep learning models, hierarchical models, and/or ensemble models. In another example, exploration apparatus 212 and/or deployment apparatus 206 include functionality to train, evaluate, and deploy machine learning models for use in performing various types of inference, prediction, classification, recommendation, clustering, and/or regression.

Figure 4:
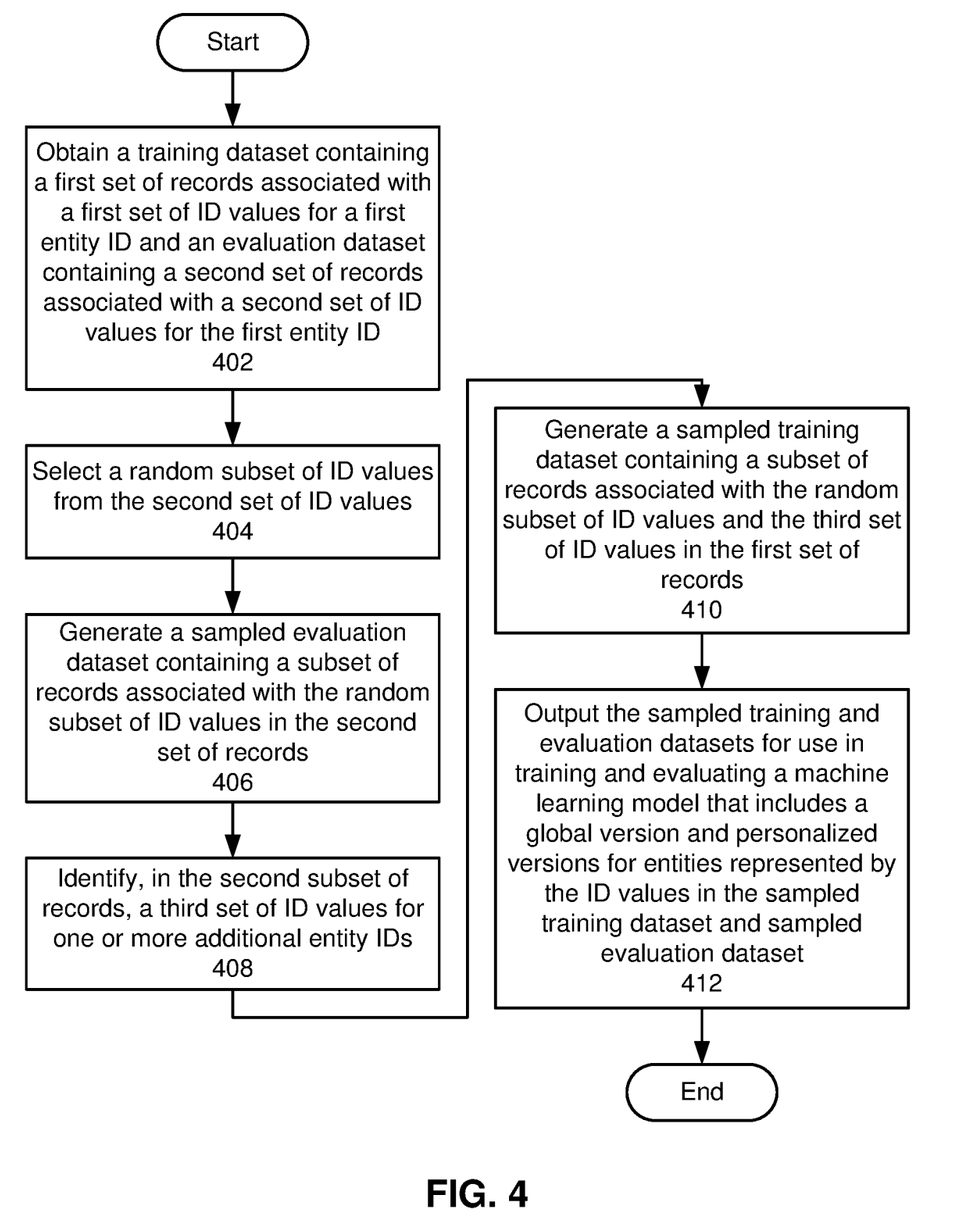
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a training dataset containing a first set of records associated with a first set of ID values for a first entity ID and an evaluation dataset containing a second set of records associated with a second set of ID values for the first entity ID are obtained (operation 402). For example, the training dataset and evaluation dataset contain records associated with member IDs for members of an online system, such as online network 118 of FIG. 1. The training dataset contains a significantly larger number of records than the evaluation dataset and/or a superset of member IDs in the evaluation dataset.

A random subset of ID values is selected from the second set of ID values (operation 404), and a sampled evaluation dataset containing a subset of records associated with the random subset of ID values in the second set of records is generated (operation 406). For example, the random subset of ID values is generated and/or selected to include a proportion (e.g., fraction, percentage, etc.) of ID values in the evaluation dataset. The sampled evaluation dataset is then generated to include records in the evaluation dataset that are associated with the random subset of ID values.

A third set of ID values for one or more additional entity IDs is identified in the second subset of records (operation 408), and a sampled training dataset containing a subset of records associated with the random subset of ID values and the third set of ID values in the first set of records is generated (operation 410). For example, the third set of ID values includes job IDs and/or other types of entity IDs associated with records in the sampled evaluation dataset. To ensure that the sampled training dataset includes all entity ID values found in the sampled evaluation dataset, all records in the training dataset that are associated with any of the entity ID values in the sampled evaluation dataset are added to the sampled training dataset.

The sampled training and evaluation datasets are then outputted for use in training and evaluating a machine learning model that includes a global version and personalized versions for entities represented by the ID values in the sampled training dataset and sampled evaluation dataset (operation 412). For example, the sampled training dataset and sampled evaluation datasets are stored in a data store and/or transmitted to a component that performs training and evaluation of the machine learning model. The component then uses the sampled training and evaluation datasets to explore different training configurations for the machine learning model, as described in further detail below with respect to FIG. 5.

Figure 5:
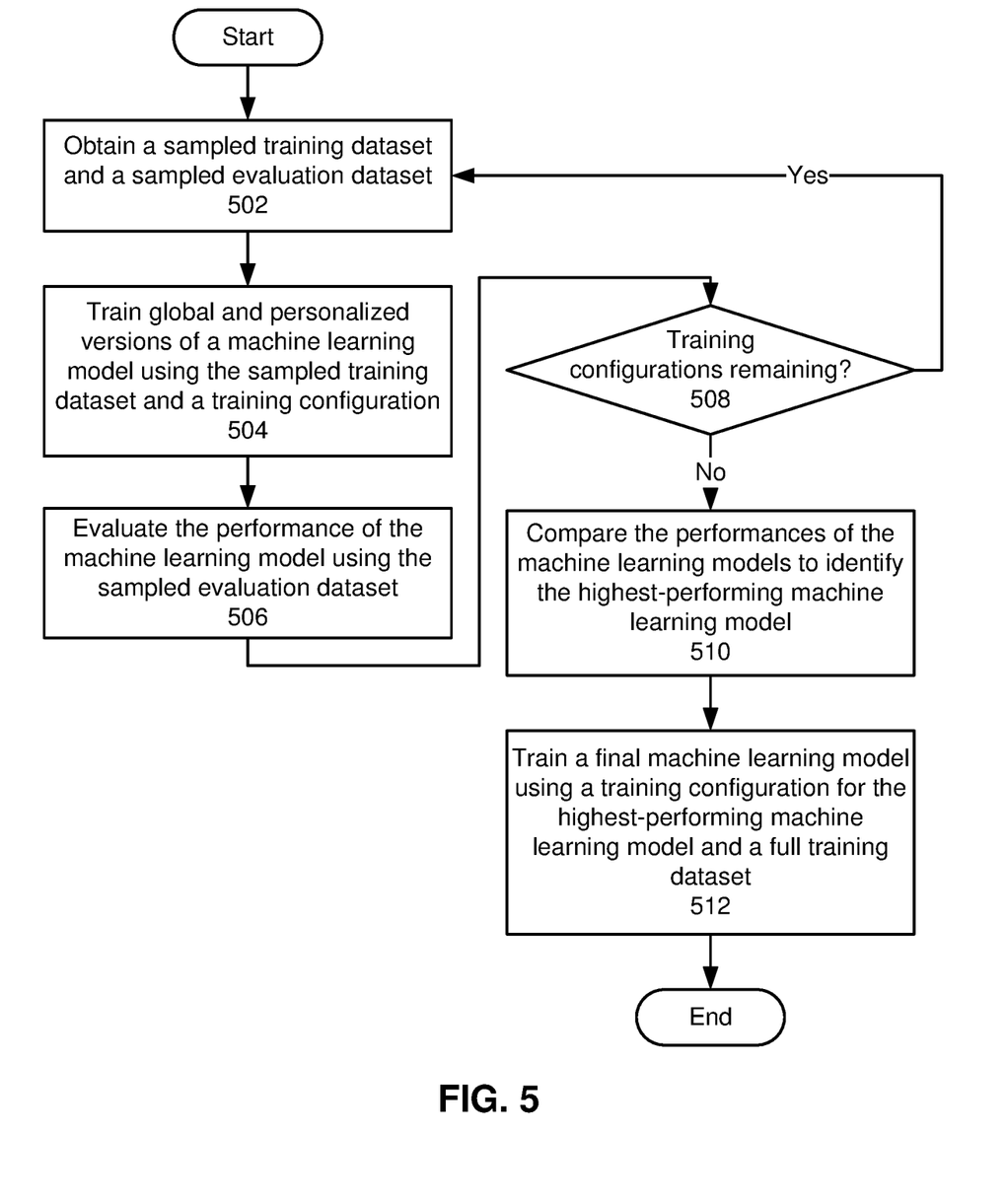
FIG. 5 shows a flowchart illustrating a process of performing model exploration in accordance with the disclosed embodiments.

FIG. 5 shows a flowchart illustrating a process of performing model exploration in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a sampled training dataset and a sampled evaluation dataset are obtained (operation 502). As described above, the sampled training dataset and sampled evaluation dataset are generated so that all entity IDs associated with records in the sampled evaluation dataset are also included in the sampled training dataset.

Next, global and personalized versions of a machine learning model are trained using the sampled training dataset and a training configuration (operation 504). For example, the training configuration includes one or more features and/or hyperparameters for the machine learning model. The global version of the machine learning model is trained using records associated with all entities in the training dataset. Each personalized version in a first set of personalized versions of the machine learning model is trained using records associated with a corresponding ID value for a first entity ID (e.g., a member ID), and each personalized version in a second set of personalized versions of the machine learning model is trained using records associated with a corresponding ID value for a second entity ID (e.g., a job ID).

After all versions of the machine learning model have been trained, the performance of the machine learning model is evaluated using the sampled evaluation dataset (operation 506). For example, the machine learning model is applied to features in the sampled evaluation dataset to produce a set of scores, and one or more performance metrics are calculated from the set of scores and labels for the features in the sampled evaluation dataset.

Operations 502-506 are repeated for remaining training configurations (operation 508). For example, multiple machine learning models are trained and evaluated using different sampled training datasets and sampled evaluation datasets. Each machine learning model is additionally trained using a different set of features and/or hyperparameters specified in the corresponding training configuration.

The performances of the machine learning models are then compared to identify the highest-performing machine learning model (operation 510). For example, the highest-performing machine learning model is identified to have the best single performance metric and/or the best value generated by aggregating multiple performance metrics.

Finally, a final machine learning model is trained using a training configuration for the highest-performing machine learning model and a full training dataset (operation 512). For example, the final machine learning model is trained using the hyperparameters and/or features specified in the training configuration for the highest-performing machine learning model. The final machine learning model is also trained using a full training dataset instead of a much smaller sampled training dataset that is generated from a subset of records in the full training dataset. During training of the final machine learning model, a regularization hyperparameter associated with the global version of the machine learning models is obtained from the training configuration, and the regularization hyperparameter is scaled by the inverse of the proportion of the training dataset represented by the sampled training dataset. For example, the regularization hyperparameter is scaled by the number of records in the full training dataset divided by the number of records in the sampled training dataset.

Figure 6:
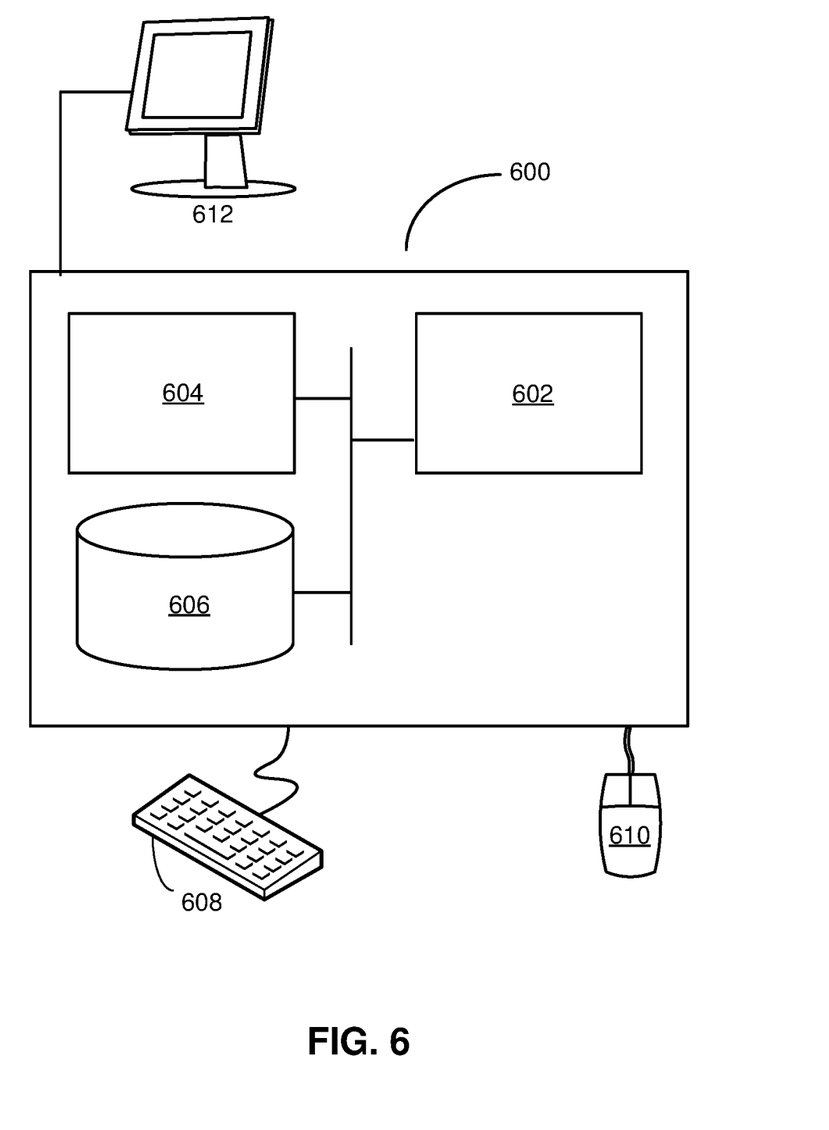
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system includes a sampling apparatus and an exploration apparatus. The sampling apparatus obtains a training dataset containing a first set of records associated with a first set of ID values and an evaluation dataset containing a second set of records associated with a second set of ID values. Next, the sampling apparatus selects a random subset of ID values from the second set of ID values. The sampling apparatus then generates a sampled evaluation dataset comprising a first subset of records associated with the random subset of ID values in the second set of records. The sampling apparatus also generates a sampled training dataset comprising a second subset of records associated with the random subset of ID values in the first set of records. The sampling apparatus outputs the sampled training dataset and the sampled evaluation dataset for use in training and evaluating a machine learning model, and the exploration apparatus trains the machine learning model using the sampled training dataset and evaluates the machine learning model using the sampled evaluation dataset.

In addition, one or more components of computer system 600 may be remotely located and connected to the other components over a network. Portions of the present embodiments (e.g., sampling apparatus, exploration apparatus, deployment apparatus, data repository, online network, etc.) may also be located on different nodes of a distributed system that implements the embodiments. For example, the present embodiments may be implemented using a cloud computing system that samples training and evaluation datasets for use with a set of remote machine learning models.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core)

that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
   obtaining a training dataset comprising a first set of records associated with a first set of identifier (ID) values for a first entity ID and an evaluation dataset comprising a second set of records associated with a second set of ID values for the first entity ID;
   selecting a random subset of ID values for the first entity ID from the second set of ID values;
   generating from the second set of records a sampled evaluation dataset comprising a first subset of records associated with the subset of ID values randomly selected from the second set of records;
   generating from the first set of records, a sampled training dataset comprising a second subset of records associated with the subset of ID values randomly selected from the second set of records;
   outputting the sampled training dataset and the sampled evaluation dataset to generate a plurality of instances of the sampled training dataset and the sampled evaluation dataset;
   training a global version and a first set of personalized versions of a first machine learning model using a first instance of the sampled training dataset and a first training configuration;
   evaluating a first performance of the first machine learning model using a first instance of the sampled evaluation dataset;
   comparing the first performance of the first machine learning model with a second performance of a second machine learning model that has been trained using a second training configuration to identify a highest-performing machine learning model within the first and second machine learning models; and
   training a third machine learning model using the training configuration for the highest-performing machine learning model and the training dataset, wherein training the third machine learning model comprises i) obtaining a regularization hyperparameter from the training configuration of the global version, and ii) scaling the regularization hyperparameter by an inverse of a proportion of the training dataset represented by the sampled training dataset.

2. The method of claim 1, wherein the first training configuration comprises one or more features.

3. The method of claim 1, wherein the first training configuration comprises one or more hyperparameters.

4. The method of claim 1, further comprising:
   identifying, in the first subset of records, a third set of ID values for a second entity ID; and
   adding, to the sampled training dataset, additional records associated with the third set of ID values in the first set of records.

5. The method of claim 4, further comprising:
   training a second set of personalized versions of the first machine learning model for a second set of entities represented by the third set of ID values using the sampled training dataset and a first training configuration.

6. The method of claim 4, wherein the second entity ID represents a job.

7. The method of claim 1, wherein selecting the random subset of ID values from the second set of ID values comprises:
   generating the random subset of ID values to include a proportion of the second set of ID values.

8. The method of claim 1, wherein the first entity ID represents a member.

9. A system comprising:
   one or more processors; and
   memory storing instructions that, when executed by the one or more processors, cause the system to:
   obtain a training dataset comprising a first set of records associated with a first set of identifier (ID) values for a first entity ID and an evaluation dataset comprising a second set of records associated with a second set of ID values for the first entity ID;
   select a random subset of ID values for the first entity ID from the second set of ID values;
   generate from the second set of records a sampled evaluation dataset comprising a first subset of records associated with the subset of ID values randomly selected from the second set of records;
   generate from the first set of records, a sampled training dataset comprising a second subset of records associated with the subset of ID values randomly selected from the second set of records; and
   output the sampled training dataset and the sampled evaluation dataset to generate a plurality of instances of the sampled training dataset and the sampled evaluation dataset
   train a global version and a first set of personalized versions of a first machine learning model using a first instance of the sampled training dataset and a first training configuration;
   evaluating a first performance of the first machine learning model using a first instance of the sampled evaluation dataset;
   comparing the first performance of the first machine learning model with a second performance of a second machine learning model that has been trained using a second training configuration to identify a highest-performing machine learning model within the first and second machine learning models; and
   training a third machine learning model using the training configuration for the highest-performing machine learning model and the training dataset, wherein training the third machine learning model comprises i) obtaining a regularization hyperparameter from the training configuration of the global version, and ii) scaling the regularization hyperparameter by an inverse of a proportion of the training dataset represented by the sampled training dataset.

10. The system of claim 9, wherein the first training configuration comprises one or more features.

11. The system of claim 9, wherein the memory further stores instructions that, when executed by the one or more processors, cause the system to:
    identify, in the first subset of records, a third set of ID values for a second entity ID; and add, to the sampled training dataset, additional records associated with the third set of ID values in the first set of records.

12. The system of claim 11, wherein the first entity ID represents and the second entity ID represents a job.

13. A non-transitory computer-readable storage medium storing instructions that when executed by a computer cause the computer to perform a method, the method comprising:
obtaining a training dataset comprising a first set of records associated with a first set of entity identifier (ID) values and an evaluation dataset comprising a second set of records associated with a second set of entity ID values;
selecting a random subset of entity ID values from the second set of entity ID values;
generating from the second set of records, a sampled evaluation dataset comprising a first subset of records associated with the subset of entity ID values randomly selected from the second set of records;
generating from the first set of records, a sampled training dataset comprising a second subset of records associated with the subset of ID values randomly selected from second set of records;
outputting the sampled training dataset and the sampled evaluation dataset to generate a plurality of instances of the sampled training dataset and the sampled evaluation dataset;
training a global version and a first set of personalized versions of a first machine learning model using a first instance of the sampled training dataset and a first training configuration;
evaluating a first performance of the first machine learning model using a first instance of the sampled evaluation dataset;
comparing the first performance of the first machine learning model with a second performance of a second machine learning model that has been trained using a second training configuration to identify a highest-performing machine learning model within the first and second machine learning models; and
training a third machine learning model using the training configuration for the highest-performing machine learning model and the training dataset, wherein training the third machine learning model comprises i) obtaining a regularization hyperparameter from the training configuration of the global version, and ii) scaling the regularization hyperparameter by an inverse of a proportion of the training dataset represented by the sampled training dataset.

* * * * *

UNITED STATES PATENT AND TRADEMARK OFFICE
CERTIFICATE OF CORRECTION

PATENT NO. : 11,704,566 B2
APPLICATION NO. : 16/446924
DATED : July 18, 2023
INVENTOR(S) : Ma et al.

Page 1 of 1

It is certified that error appears in the above-identified patent and that said Letters Patent is hereby corrected as shown below:

In the Claims

In Column 20, Line 34, in Claim 9, after "records;", delete "and"

In Column 20, Line 38, in Claim 9, after "dataset", insert --;--

In Column 20, Line 39, in Claim 9, delete "train" and insert --training-- therefor Signed and Sealed this
Fourteenth Day of November, 2023

Katherine Kelly Vidal
*Director of the United States Patent and Trademark Office*